(12) United States Patent
Keswani et al.

(10) Patent No.: US 10,482,100 B1
(45) Date of Patent: Nov. 19, 2019

(54) METHOD TO DETECT AND SCORE USERS WHO ARE LIKELY TO MAKE PAYMENTS IN ONLINE SOCIAL GAMES

(71) Applicant: Zynga Inc., San Francisco, CA (US)

(72) Inventors: Girish Keswani, Santa Clara, CA (US); Jim Baer, San Francisco, CA (US); Kenneth Rudin, Palo Alto, CA (US)

(73) Assignee: Zynga Inc., San Francisco, CA (US)

( * ) Notice: Subject to any disclaimer, the term of this patent is extended or adjusted under 35 U.S.C. 154(b) by 190 days.

(21) Appl. No.: 13/748,205

(22) Filed: Jan. 23, 2013

Related U.S. Application Data

(60) Provisional application No. 61/590,554, filed on Jan. 25, 2012, provisional application No. 61/590,553, filed on Jan. 25, 2012, provisional application No. 61/590,547, filed on Jan. 25, 2012.

(51) Int. Cl.
| | | |
|---|---|---|
| *G06F 16/27* | (2019.01) | |
| *A63F 13/79* | (2014.01) | |
| *A63F 13/70* | (2014.01) | |
| *A63F 13/30* | (2014.01) | |
| *A63F 13/358* | (2014.01) | |
| *A63F 13/77* | (2014.01) | |
| *A63F 13/35* | (2014.01) | |

(52) U.S. Cl.
CPC .............. *G06F 16/27* (2019.01); *A63F 13/79* (2014.09); *A63F 13/30* (2014.09); *A63F 13/35* (2014.09); *A63F 13/358* (2014.09); *A63F 13/70* (2014.09); *A63F 13/77* (2014.09)

(58) Field of Classification Search
CPC .......... A63F 13/00; A63F 13/12; A63F 13/77; A63F 13/79; A63F 13/70; A63F 13/30; A63F 13/35; A63F 13/358; G06Q 30/0209; G06Q 30/0224
USPC ...... 463/39–43, 1; 705/1.1, 7.11, 7.29, 7.31, 705/14.12, 14.25
See application file for complete search history.

(56) References Cited

U.S. PATENT DOCUMENTS

| | | | |
|---|---|---|---|
| 2009/0170608 A1* | 7/2009 | Herrmann et al. | ............. 463/42 |
| 2010/0167816 A1* | 7/2010 | Perlman | ................. A63F 13/12 463/30 |
| 2011/0218045 A1* | 9/2011 | Williams et al. | ............... 463/42 |
| 2012/0094762 A1* | 4/2012 | Khan | ...................... A63F 13/12 463/42 |
| 2013/0035989 A1* | 2/2013 | Brown et al. | ................. 705/7.33 |
| 2013/0073366 A1* | 3/2013 | Heath | ................ G06Q 30/0261 705/14.25 |
| 2013/0103479 A1* | 4/2013 | Liu | ........................ G06Q 10/00 705/14.25 |
| 2013/0103521 A1* | 4/2013 | Liu | ........................ G06Q 30/06 705/26.1 |
| 2013/0103534 A1* | 4/2013 | Liu | .................... G06Q 30/0201 705/26.7 |

(Continued)

*Primary Examiner* — Chase E Leichliter
(74) *Attorney, Agent, or Firm* — Schwegman Lundberg & Woessner, P.A.

(57) ABSTRACT

A method and a system for identifying players likely to spend in an online game are described. Indicators corresponding to activities of the player and in-game friends of the player in an online game and in other online games are determined. A prediction model of the player's likelihood to spend in the online game is computed based on the indicators. The prediction model is used to identify players of the online game that are likely to spend in the online game.

24 Claims, 11 Drawing Sheets

(56) References Cited

U.S. PATENT DOCUMENTS

2013/0173756 A1* 7/2013 Luna .................. H04L 43/0876
                                                                      709/219

* cited by examiner

METHOD TO DETECT AND SCORE USERS WHO ARE LIKELY TO MAKE PAYMENTS IN ONLINE SOCIAL GAMES

RELATED APPLICATIONS

The present application claims priority from provisional U.S. Provisional Patent Application Ser. No. 61/590,554, filed Jan. 25, 2012, the entire contents of which is incorporated herein by reference, U.S. Provisional Patent Application Ser. No. 61/590,553, filed Jan. 25, 2012, the entire contents of which is incorporated herein by reference, U.S. Provisional Patent Application Ser. No. 61/590,547, filed Jan. 25, 2012, the entire contents of which is incorporated herein by reference.

TECHNICAL FIELD

The present disclosure generally relates to games and applications in general and, in particular embodiments, to computer-implemented, online social games.

BACKGROUND

Online social games are becoming widespread. The success of an online social game depends on the number of players and how often these players visit the online social game. As such, the retention of online players to visit, play, and spend in the online social game is an important factor towards the success of the online social games.

BRIEF DESCRIPTION OF THE DRAWINGS

The present inventive subject matter is illustrated by way of example, and not by way of limitation, in the figures of the accompanying drawings in which.

DETAILED DESCRIPTION

Although the present inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

A method and a system for identifying players likely to spend in an online game are described. Indicators corresponding to activities of the player and in-game friends of the player in an online game and in other online games are determined. A prediction model of the player's likelihood to spend in the online game is computed based on the indicators. The prediction model is used to identify players of the online game that are likely to spend in the online game. A recommendation may be generated based on the prediction model.

In one embodiment, the indicators include an in-game player engagement indicator of the player in the online game, an in-game payment history of the player in the online game, an in-game friends engagement indicator of the in-game friends of the player of the online game, an in-game friends payment history of the in-game friends of the player of the online game, a number of other online games played by the player of the online game, and an in-game payment history in the other games played by the user.

In one embodiment, the prediction model may be generated using a Naïve Bayes approach algorithm. In another embodiment, the prediction model may be generated using a decision tree approach.

Figure 1:
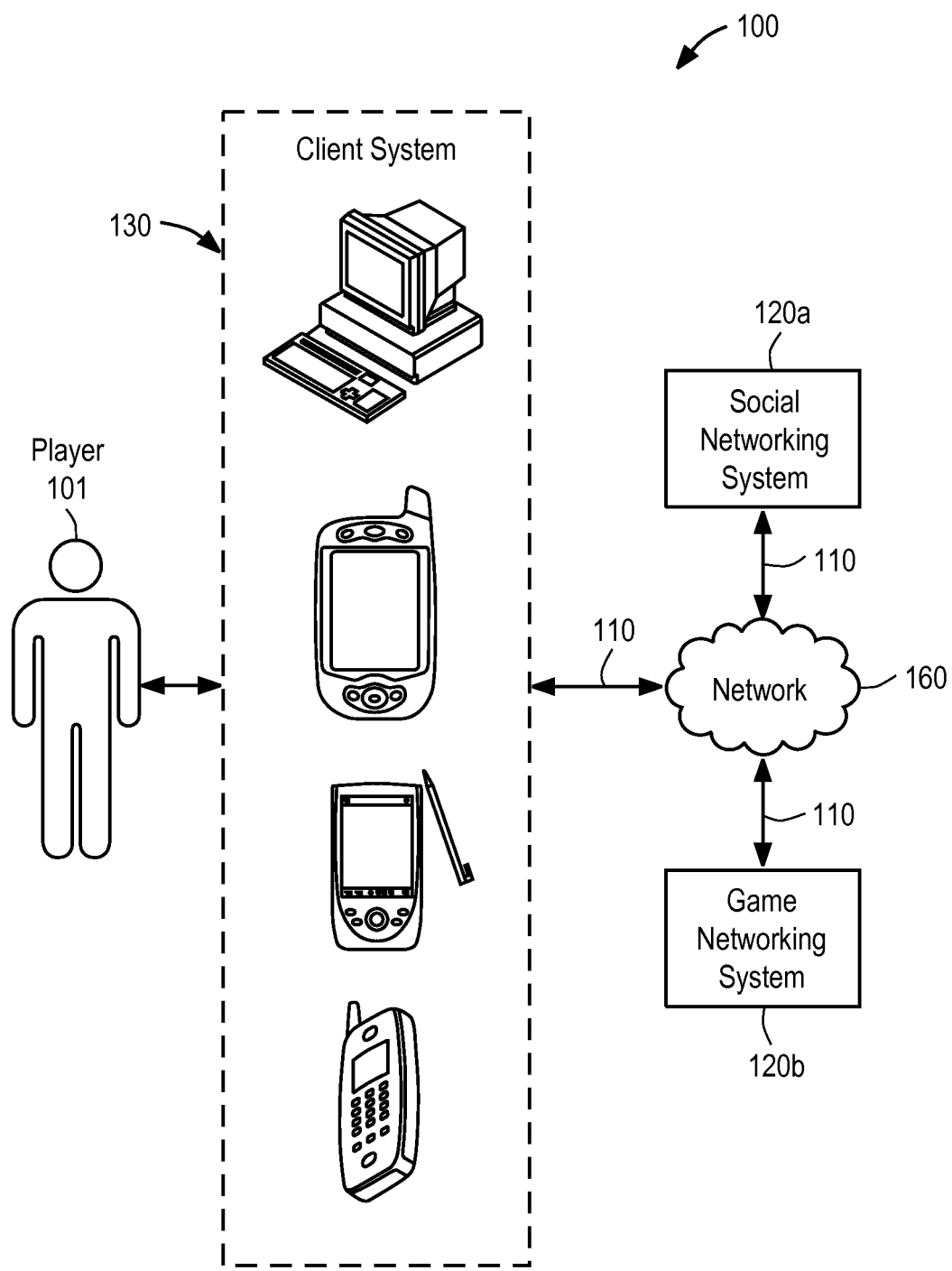
FIG. 1 illustrates an example embodiment of a system for implementing particular disclosed embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120*a* and game networking system 120*b*. Client system 130 can access social networking system 120*a* or game networking system 120*b* directly, via network 160, or via a third-party system. As an example and not by way of limitation, client system 130 may access game networking system 120*b* via social networking system 120*a*. Client system 130 can be any suitable computing device, such as a personal computer, laptop, cellular phone, smart phone, computing tablet, etc.

Although FIG. 1 illustrates a particular number of players 101, social networking systems 120*a*, game networking systems 120*b*, client systems 130, and networks 160, this disclosure contemplates any suitable number of players 101, social networking systems 120*a*, game networking systems 120*b*, client systems 130, and networks 160. As an example and not by way of limitation, system 100 may include one or more game networking systems 120*b* and no social networking systems 120*a*. As another example and not by way of limitation, system 100 may include a system that comprises both social networking system 120*a* and game networking system 120*b*. Moreover, although FIG. 1 illustrates a particular arrangement of player 101, social networking system 120*a*, game networking system 120*b*, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

Game Networking System

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player 101 may have a game account on game networking system 120*b*, wherein the game account can contain a variety of information associated with the player 101 (e.g., the player's personal information, financial information, purchase history, player character state, game state). In some embodiments, a player 101 may play multiple games on game networking system 120*b*, which may maintain a single game account for the player 101 with respect to all the games, or multiple individual game accounts for each game with respect to the player 101. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables.

Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120*a* or game networking system 120*b*). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120*b*, which is managed by the game operator. In other embodiments, the social graph is part of a social networking system 120*a* managed by a third-party (e.g., Facebook, Friendster, Myspace). In yet other embodiments, player 101 has a social network on both game networking system 120*b* and social networking system 120*a*, wherein player 101 can have a social network on the game networking system 120*b* that is a subset, superset, or independent of the player's social network on social networking system 120*a*. In such combined systems, game networking system 120*b* can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
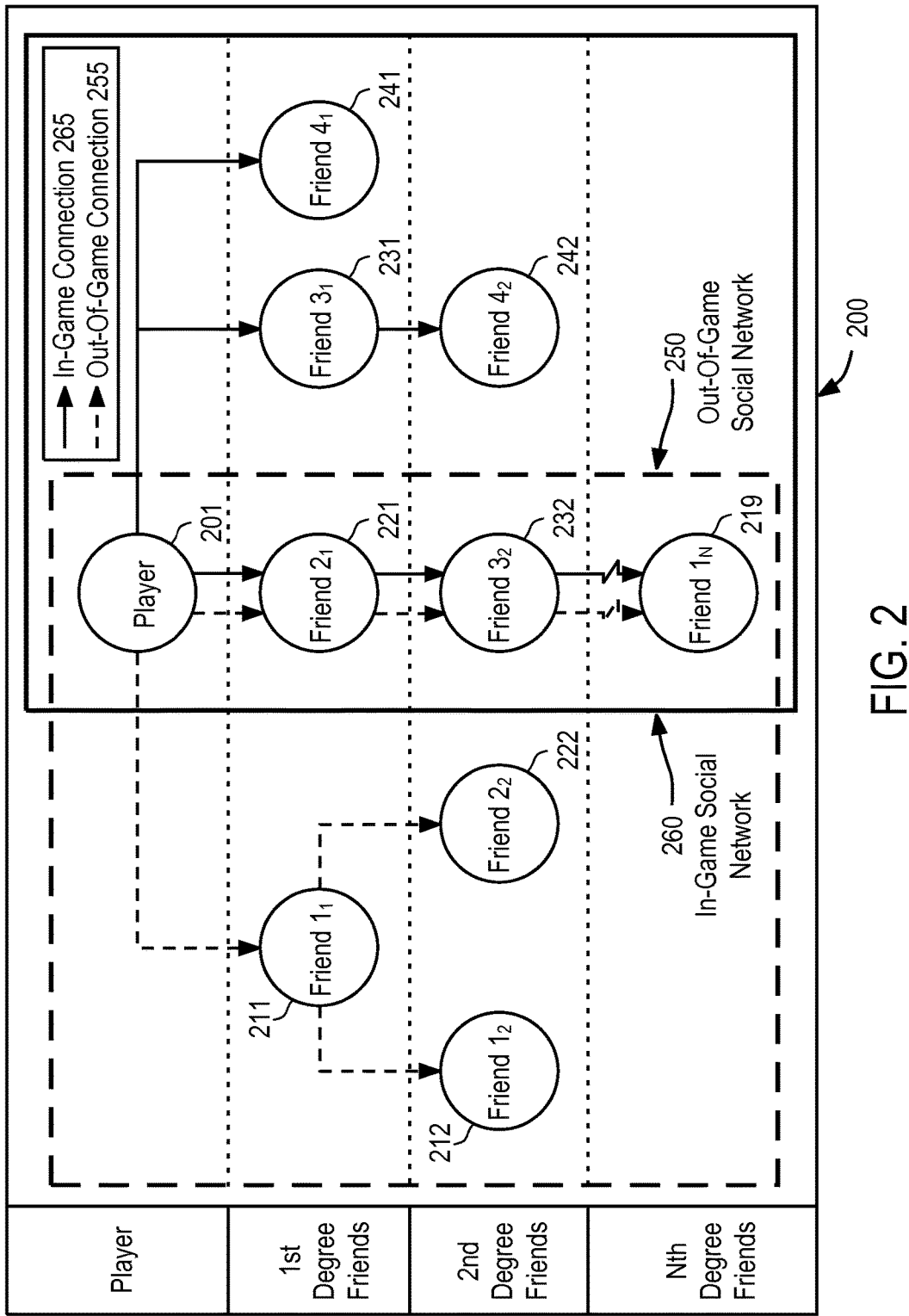
FIG. 2 illustrates an example embodiment of a social network.

FIG. 2 shows an example of a social network within a social graph. As shown, Player 201 can be associated, connected or linked to various other users, or "friends," within the social network 200. These associations, connections or links can track relationships between users within the social network 200 and are commonly referred to as online "friends" or "friendships" between users. Each friend or friendship in a particular user's social network within a social graph is commonly referred to as a "node." For purposes of illustration and not by way of limitation, the details of social network 200 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual that connection is referred to as a first-degree friend. In social network 200, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge that connects a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm or business, run a café), or other events.

An online game can be hosted by a game networking system, which can be accessed over any suitable network with an appropriate client system. A player may have a game system account on a game system, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game system and merely accessed via the third-party website. The embedded online game can be hosted solely on a server of the game system or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 3A:
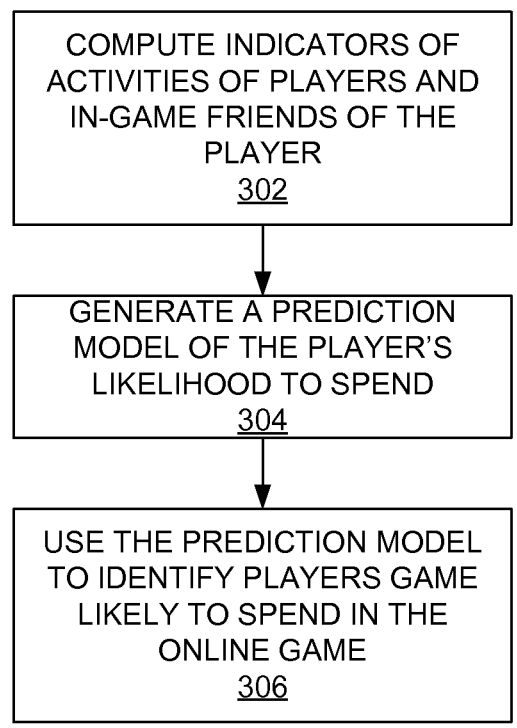
FIG. 3A illustrates a flow diagram of an example embodiment of a method for generating a prediction model of players likely to spend in an online game.

FIG. 3A illustrates a flow diagram of an example of a method for generating a prediction model of players likely to spend in an online game.

The following is description of the terms used in the present document:

Likely Buyer or Predicted Buyer: a user or set of users predicted to make a payment in next 30 days as per the model.

Prior Buyers or Prior Payers: A set of users who have made at least one payment in the game so far.

Non-Prior Buyers: The set of users who have never made any payments in the game.

Conversion Rate: Defined as the ratio of the number of buyers divided by the total count of users New Buyer: A user who just made its first ever payment to the game.

Dead Buyer: A user who has paid in the game but not in last 30 days. (Dead Buyers is a loosely defined terms in the context of experimentation.)

At operation 302, indicators corresponding to activities of the player and in-game friends of the player in an online game and in other online games are computed. In one embodiment, the indicators include but are not limited to an in-game player engagement indicator of the player in the online game, an in-game payment history of the player in the online game, an in-game friends engagement indicator of the in-game friends of the player of the online game, an in-game friends payment history of the in-game friends of the player of the online game, a number of other online games played by the player of the online game, and an in-game payment history in the other games played by the user.

In one embodiment, the following seven factors used in the prediction model are described as follows:

1) User Engagement may include a measure of a user's in-game engagement computed using exponential moving average of days played during last several weeks (e.g., four weeks). This value ranges between 0 and 7. Smaller value refers to low or declining engagement and higher value refers to high or increasing engagement. For example, the user engagement may be represented as: 0.6*w1+0.4*(0.6*w2+0.4*(0.6*w3+0.4*w4)), where w1 represents the number of days played in last week, and w2 represents the number of days played in the last week.

2) Payment History may be an indicator of whether a user has made a prior payment to the game or not. A value of 1 signifies that user made at least 1 payment to the game in past whereas 0 refers to the fact that the user is not a prior payer. Past payment behavior is by far the most informative in predicting future payments.

3) In-game friends engagement may be defined as the average of "User Engagement" for in-game friends of the user. For example, the in-game friends engagement may include an average measure of in-game friends engagement from the number of days played in last four weeks.

4) In-game Friends Payment History may be defined as the average of "Payment History" for in-game friends of the user. For example, the in-game friends payment history may include whether one or more in-game friends made a payment in the last three months for example. The friends of a payer are two or three times more likely to pay as compared to others.

5) Number of Other Zynga Games Played may include for example, a count of the number of other Zynga games played by the user during the last month.

6) Payment History in Other Zynga Games may include the number of payments made by the player in other Zynga games. A user who has made a prior Zynga payment in one game is more likely to spend in another game.

7) Engagement History in Other Zynga Games may be defined as the number of days played across Zynga games by the user in the last three months, for example.

At operation 304, a prediction model of the player's likelihood to spend or make a payment in the online game within a time window (e.g., next 30 days) is generated based on the plurality of indicators. In one embodiment, the prediction model may be generated using a Naïve Bayes approach algorithm. In another embodiment, a decision tree approach is used to determine the prediction model. For example, a decision tree may be built using these features to build a predictive model to identify users most likely to make a payment in the next 30 days. The prediction model may yield the following rules based on the obtained indicators:

If a user has no payment history and is not engaged with the game, then that user has a 22% probability to spend in the game in next 30 days.

If a user is engaged but has no prior payment history and no cross game payments and none of the user's friends paid, then that user has a 35% probability to spend in the game in next 30 days.

If a user has not paid before and is engaged with the game and did not make a payment in one of the other games but its friends are engaged and have paid, then the user has a 55% probability to spend in the game in next 30 days.

If a user has not paid before and is engaged with the game and also made a payment in one of the other games then, the user has a 70% probability to spend in the game in next 30 days.

If user made a payment in the last 90 days, then the user has a 91% probability to spend in the game in next 30 days.

At operation 306, the prediction model is used to identify players of the online game that are likely to spend in the online game in next 30 days based the prediction model.

Figure 3B:
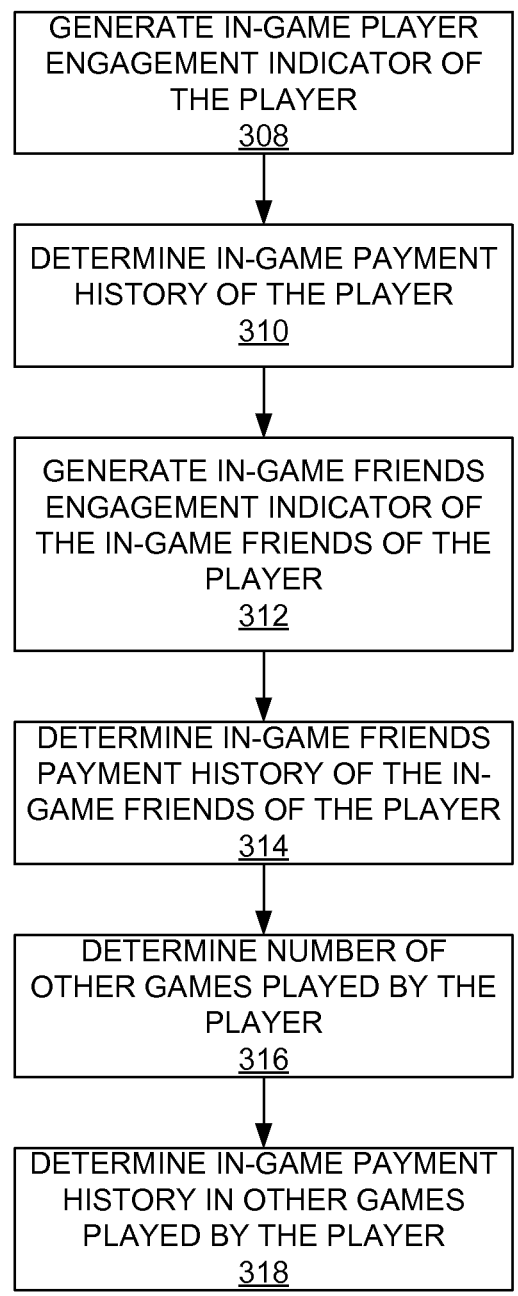
FIG. 3B illustrates a flow diagram of an example embodiment of a method for determining indicators for the prediction model of players likely to spend in the online game.

FIG. 3B illustrates a flow diagram of an example embodiment of a method for determining indicators for the prediction model of players likely to spend in the online game.

At operation 308, an in-game player engagement indicator of the player is generated as previously described.

At operation 310, an in-game payment history of the player is generated. The payment history includes an indicator of whether the player has made a prior payment to the online game.

At operation 312, an in-game friends engagement indicator is generated. The in-game friends engagement indicator may include the average of user engagement for in-game friends of the user.

At operation 314, the in-game friends payment history is determined. The in-game friends payment history may include the average of payment history for in-game friends of the user.

At operation 316, the number of other games played by the player is determined by counting the number of other games played by the player during a last predetermined number of months.

At operation 318, a payment history in the other games played is determined. The payment history in the other games played may include an engagement history in the other games played by the player.

Figure 4A:
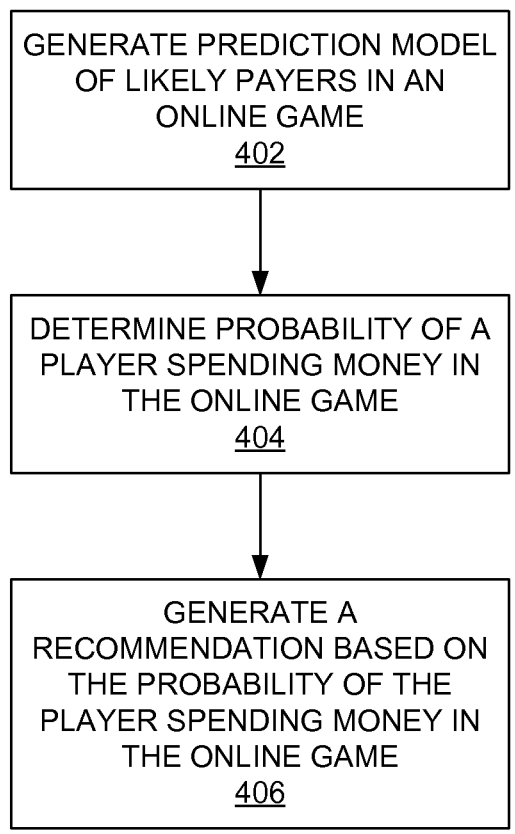
FIG. 4A illustrates a flow diagram of an example embodiment of a method for generating a recommendation based on the prediction model.

FIG. 4A illustrates a flow diagram of an example embodiment of a method for generating a recommendation based on the prediction model.

At operation 402, a prediction model of likely payers in an online game is determined.

At operation 404, a probability of a player spending money in an online game is determined.

At operation 406, a recommendation is generated based on the probability of the player spending money. The recommendation may include a targeting campaign to users who are likely to spend, or users who are not likely to spend.

Figure 4B:
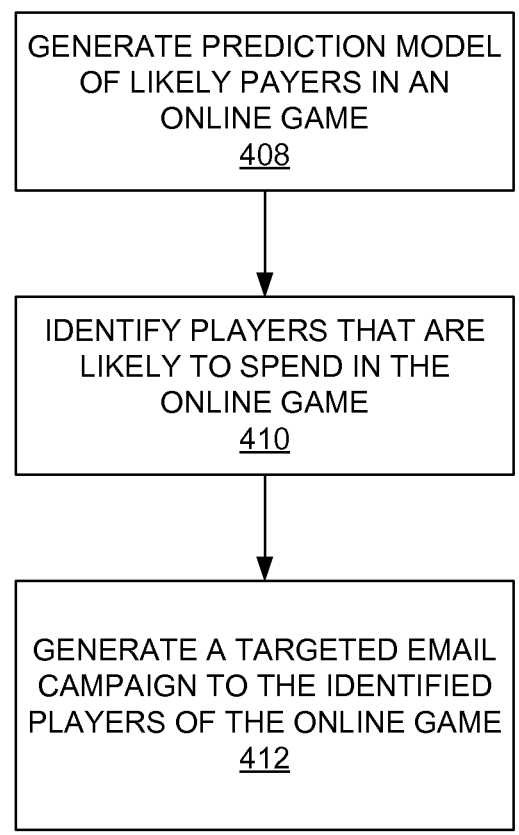
FIG. 4B illustrates a flow diagram of an example embodiment of a method for generating a targeted email campaign to identified players of the online game based on the prediction model.

FIG. 4B illustrates a flow diagram of an example embodiment of a method for generating a targeted email campaign to identified players of the online game based on the prediction model.

At operation 408, a prediction model of likely payers in an online game is determined.

At operation 410, players with that are likely to spend in the online game (e.g., players with a probability exceeding a threshold) are identified.

At operation 412, a targeting email campaign to identified players who are likely to spend in the online game is generated.

Figure 4C:
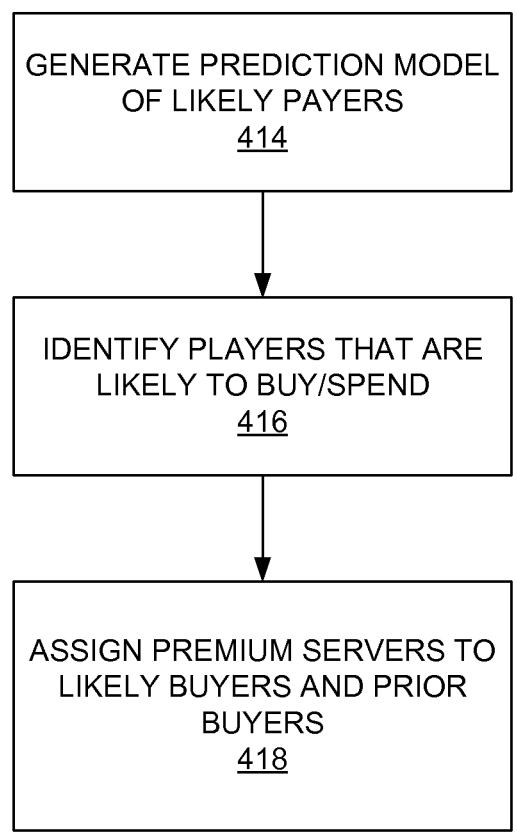
FIG. 4C illustrates a flow diagram of an example embodiment of a method for assigning premium servers to identified players of the online game based on the prediction model.

FIG. 4C illustrates a flow diagram of an example embodiment of a method for assigning premium servers to identified players of the online game based on the prediction model.

At operation 414, a prediction model of likely payers in an online game is determined.

At operation 416, players that are likely to spend in the online game (e.g., players with a probability exceeding a threshold) are identified.

At operation 418, premium servers may be assigned to the identified players who are likely to spend in the online game.

System Data Flow

Figure 5A:
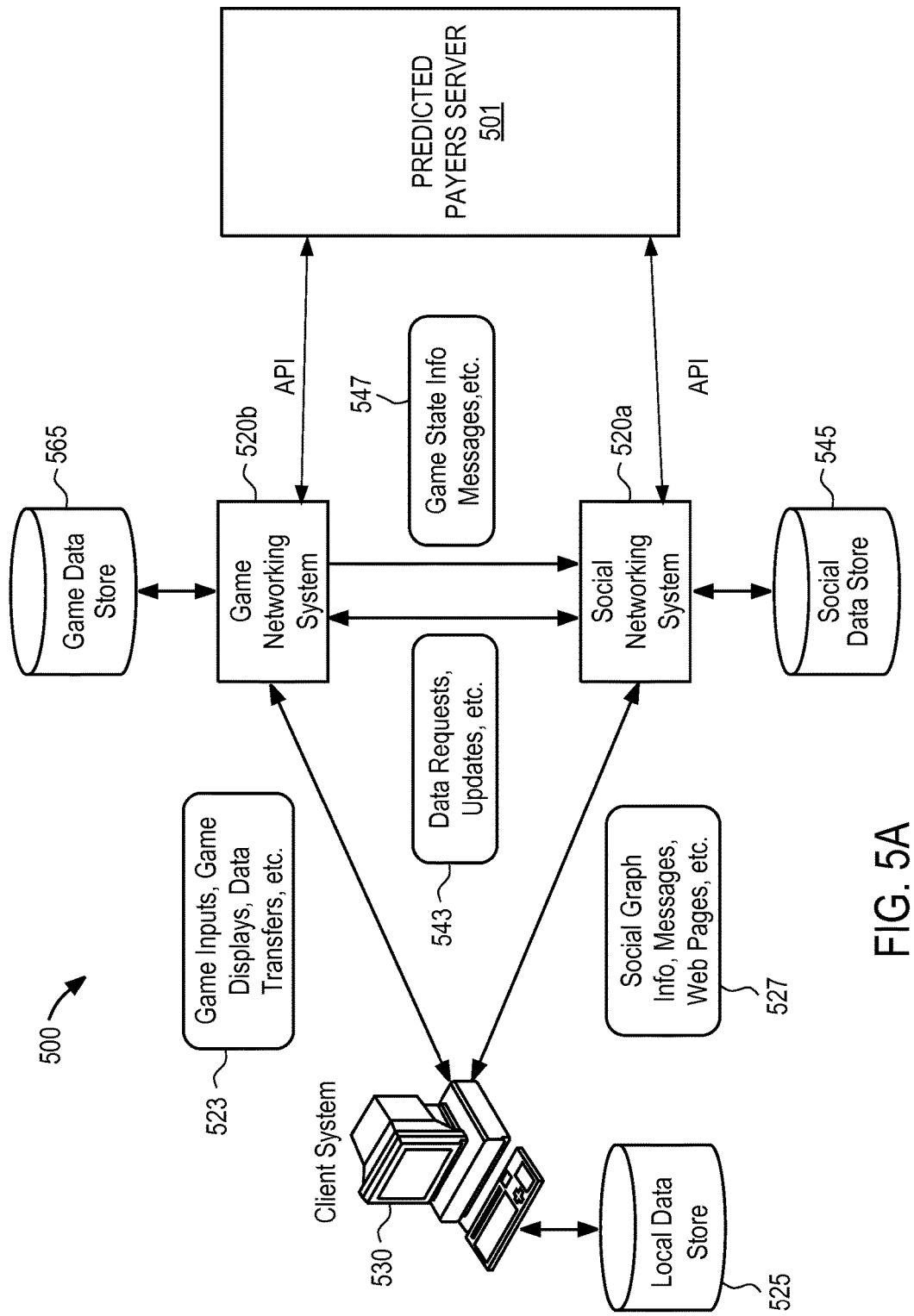
FIG. 5A illustrates an example embodiment of a data flow in a system.

FIG. 5A illustrates an example data flow between the components of system 500. In particular embodiments, system 500 can include client system 530, social networking system 520a, and game networking system 520b. The components of system 500 can be connected to each other in any suitable configuration, using any suitable type of connection. The components may be connected directly or over any suitable network. Client system 530, social networking system 520a, and game networking system 520b can each have one or more corresponding data stores such as local data store 525, social data store 545, and game data store 565, respectively. Social networking system 520a and game networking system 520b can also have one or more servers that can communicate with client system 530 over an appropriate network. Social networking system 520a and game networking system 520b can have, for example, one or more internet servers for communicating with client system 530 via the Internet. Similarly, social networking system 520a and game networking system 520b can have one or more mobile servers for communicating with client system 530 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 520b. This data 523 can include, for example, webpages, messages, game inputs, game displays, HTTP packets, data requests, transaction information, updates, and other suitable data. At some other time, or at the same time, game networking system 520b can communicate data 543, 547 (e.g., game state information, game system account information, page info, messages, data requests, updates, etc.) with other networking systems, such as social networking system 520a (e.g., Facebook, Myspace, etc.). Client system 530 can also receive and transmit data 527 to and from social networking system 520a. This data 527 can include, for example, webpages, messages, social graph information, social network displays, HTTP packets, data requests, transaction information, updates, and other suitable data.

Communication between client system 530, social networking system 520a, and game networking system 520b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 520b, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520b. Game networking system 520b may itself operate by retrieving a copy of the BLOB from a database or an intermediate memory cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520b for further processing. In addition, multiple client systems 530 may transmit other types of application data to game networking system 520b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 520a or game networking system 520b), where an instance of the online game is executed remotely on a client system 530, which then transmits application event data to the hosting system such that the remote game server synchronizes game state associated with the instance executed by the client system 530.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 520a or game networking system 520b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 520b. However, to expedite the processing and hence the speed of the overall gaming experience, the Flash client may collect a batch of some number of events or updates into a batch file. The number of events or updates may be determined by the Flash client dynamically or determined by game networking system 520b based on server loads or other factors. For example, client system 530 may send a batch file to game networking system 520b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 520b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 520b may retrieve the corresponding BLOB from the database to determine the most-recent values of the game-related data. In particular embodiments, while a player is playing the online game, game networking system 520*b* may also load the corresponding BLOB into a memory cache so that the game system may have faster access to the BLOB and the game-related data contained therein.

Social networking system 520*a* and game networking system 520*b* communicate with a Predicted Payers Server 501. An API may be provided to interface both social networking system 520*a* and game networking system 520*b* with the Predicted Payers Server 501. The Predicted Payers Server 501 may be configured to analyze data including for example, a frequency of users online engagements in the social networking system 520*a* and/or the game networking system 520*b*. Based on the analysis of the data, the Predicted Payers Server 501 is able to predict whether a user is likely to churn in the game networking system 520*b* and/or the social networking system 520*a*. Furthermore, the Predicted Payers Server 501 can also be configured to provide recommendations to the game networking system 520*b* on how to improve retaining the user/player to continue playing on the game networking system 520*b*.

Figure 5B:
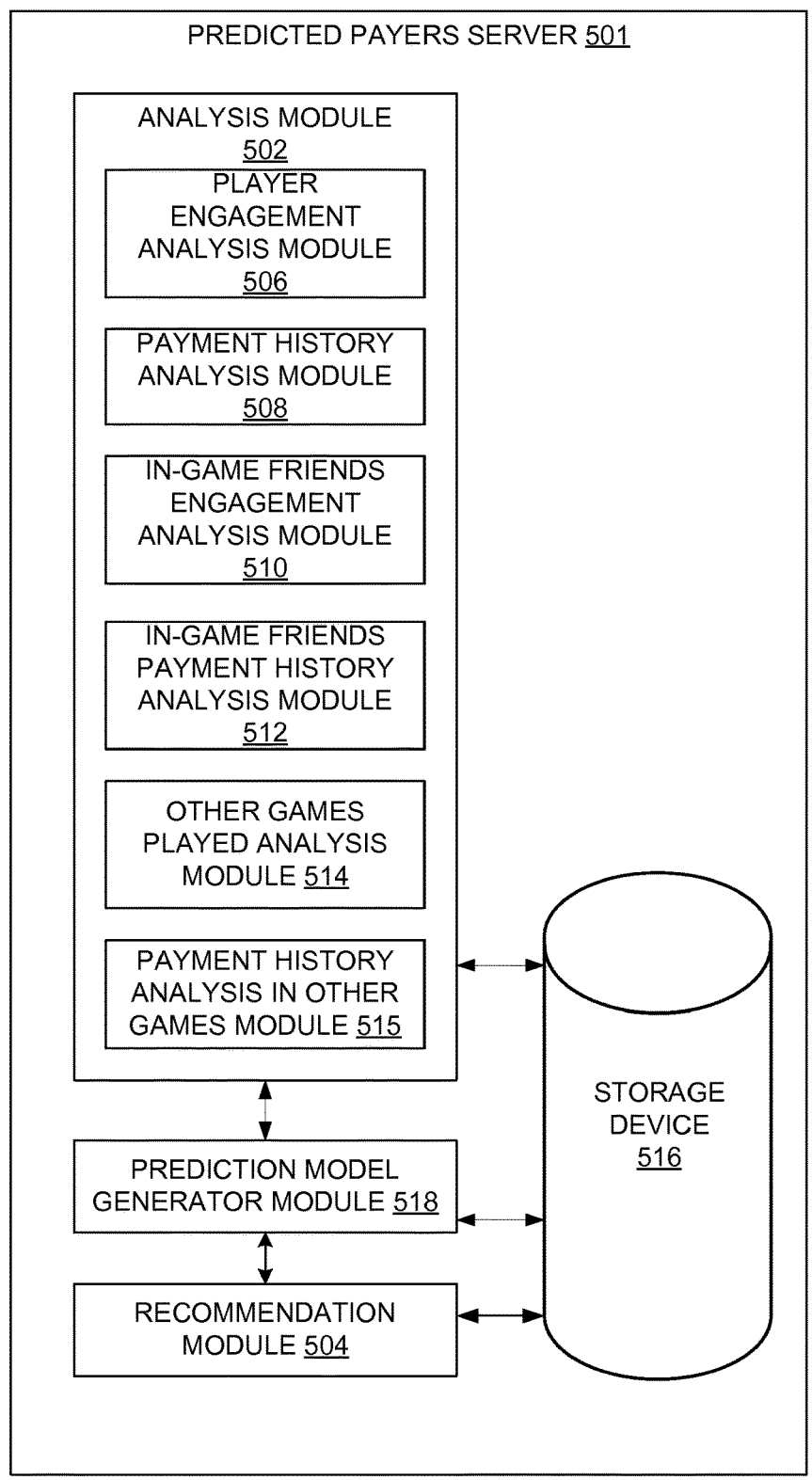
FIG. 5B is an example embodiment of a predicted payer server.

FIG. 5B is an example of the Predicted Payers server 501. The Predicted Payers Server 501 may include an analysis module 502, a recommendation module 504, a prediction model generator module 518, and a storage device 516. The analysis module 502 is configured to analyze data related to player engagements/interactions on the game networking system 520*b* and/or the social networking system 520*a*. The analysis module 502 includes a player engagement analysis module 506, a payment history analysis module 508, an in-game friends engagement analysis module 510, an in-game friends payment history analysis module 512, other games played analysis module 514, and a payment history analysis in other games module 515.

The prediction model generator module 518 generates a model to predict the likelihood of a player making a purchase or a payment in the game based on the analysis module 502.

The recommendation module 504 is configured to provide a recommendation to the game networking system 520*b* on strategies for improving retaining a player on the game networking system 520*b* and increasing the player's online engagements, interactions, and spending on the game networking system 520*b*.

The storage device 516 may store data related to the computation modules 508, 510, 512, 514, 515, the prediction model generator module 518, and the recommendation module 504 for further analysis. The storage device 516 may store historical trends and baseline values of users based on the data related to user communications and interactions and spending, on the game networking system 520*b* and/or the social networking system 520*a*.

Figure 5C:
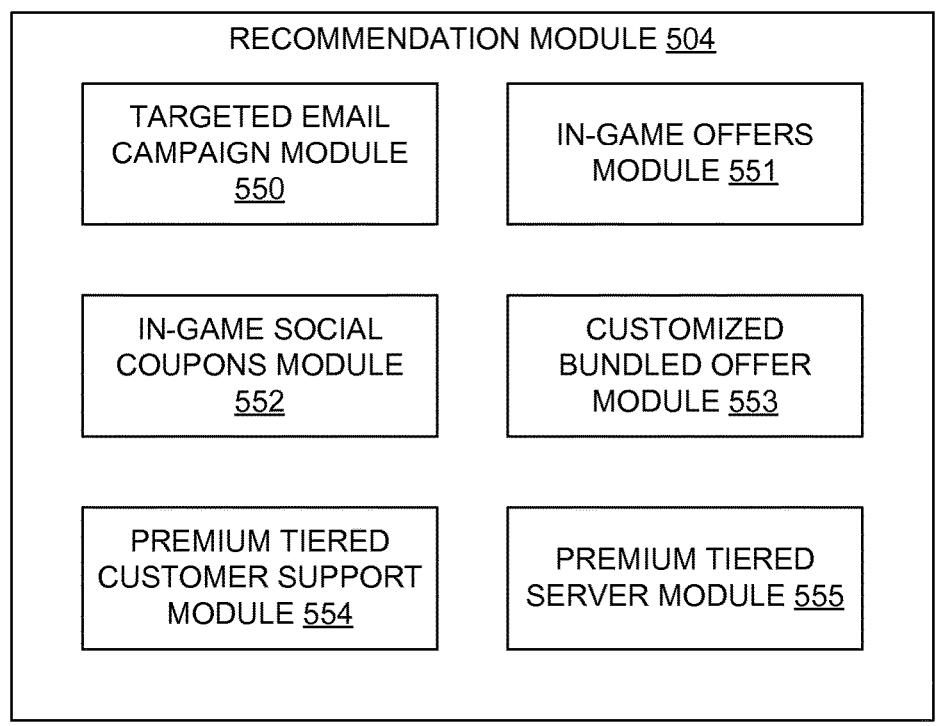
FIG. 5C is an example embodiment of a recommendation module.

FIG. 5C is an example embodiment of a recommendation module 504. The recommendation module 504 may include, for example:

Targeted Email Campaigns module 550: an email marketing strategy may be to target prior buyers and expand the target set to include likely buyers as well.

New Buyer Conversion or in-game offers module 551: in-game personalization may be used to aggressively target revenue features (e.g., flash sales, etc.) likely buyers (e.g., showing a discount offer to Likely Buyers 2*x* more often as compared to that shown for Non Likely Buyers).

Social Buying or Targeted In-Game Social Coupons module 552: coupons have proven to be an effective way of improving user conversion. With Social-Coupons, a payer would get an opportunity to share a coupon with her in-game friends right after making a payment.

Up Selling or customized bundled offer module 553: the prediction model may also be used to predict the average spending power of a user, and may be used as well to up-sell packages to users based on their wallet size. Further, the model may be used in designing dynamic customized bundles based on likelihood to pay.

Prioritize Customer Support or premium tiered customer support module 554: the online game may provide a better customer support to the users who are very likely to make a payment.

Quality of Service Models or premium tiered server module 555: the idea is to provide a tiered approach for load balancing servers using this data to route best customers (prior buyers and likely buyers) to premium servers for minimal interruption in performance.

System and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 6:
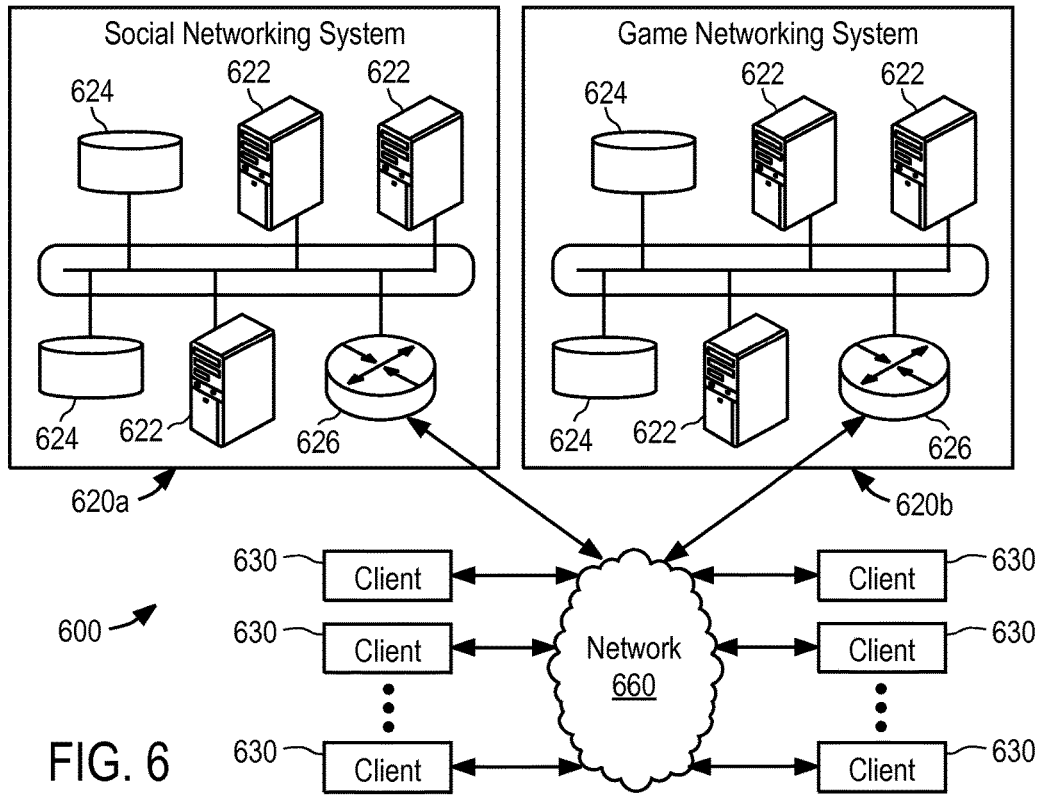
FIG. 6 illustrates an example embodiment of a network environment.

Particular embodiments may operate in a wide area network environment, such as the Internet, including multiple network addressable systems. FIG. 6 illustrates an example network environment 600 in which various example embodiments may operate. Network cloud 660 generally represents one or more interconnected networks, over which the systems and hosts described herein can communicate. Network cloud 660 may include packet-based wide area networks (such as the Internet), private networks, wireless networks, satellite networks, cellular networks, paging networks, and the like. As FIG. 6 illustrates, particular embodiments may operate in a network environment 600 comprising one or more networking systems, such as social networking system 620*a*, game networking system 620*b*, and one or more client systems 630. The components of social networking system 620*a* and game networking system 620*b* operate analogously; as such, hereinafter they may be referred to simply at networking system 620. Client systems 630 are operably connected to the network environment 600 via a network service provider, a wireless carrier, or any other suitable means.

Networking system 620 is a network addressable system that, in various example embodiments, comprises one or more physical servers 622 and data stores 624. The one or more physical servers 622 are operably connected to computer network cloud 660 via, by way of example, a set of routers and/or networking switches 626. In an example embodiment, the functionality hosted by the one or more physical servers 622 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular webpage (hereinafter also referred to as target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client system 630. The request may also include location information identifying a geographic location of the user's client system 630 or a logical network location of the user's client system 630. The request may also include a timestamp identifying when the request was transmitted.

Although the example network environment 600 described above and illustrated in FIG. 6 is described with respect to social networking system 620*a* and game networking system 620*b*, this disclosure encompasses any suitable network environment using any suitable systems. As an example and not by way of limitation, the network environment may include online media systems, online reviewing systems, online search engines, online advertising systems, or any combination of two or more such systems.

Figure 7:
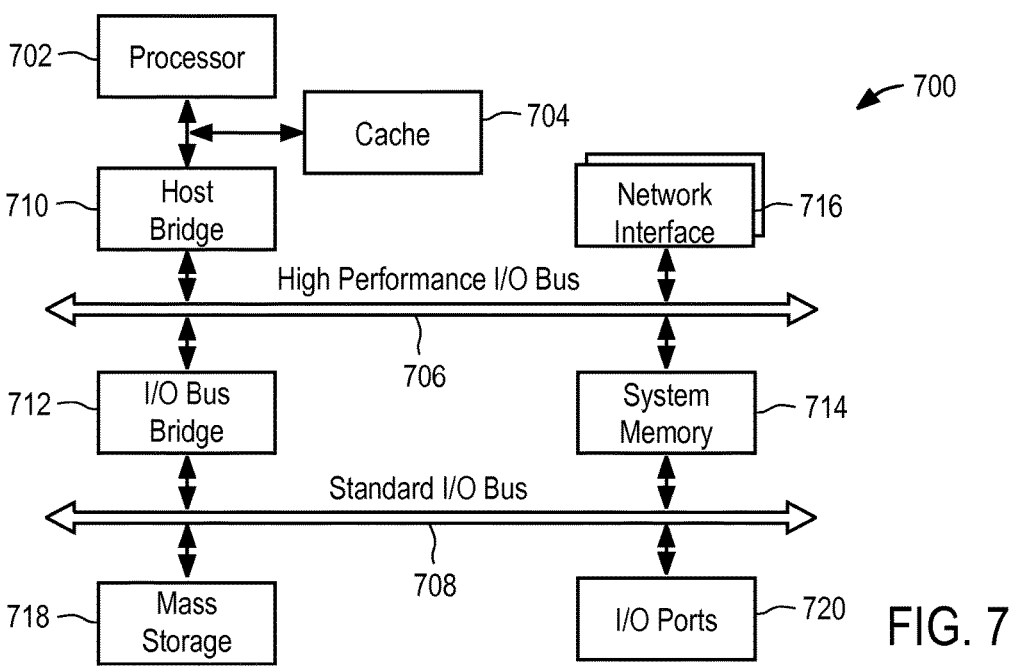
FIG. 7 illustrates an example embodiment of a computer system architecture.

FIG. 7 illustrates an example computing system architecture, which may be used to implement a server 622 or a client system 630. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in servers 622, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures, and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the inventive subject matter can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   with respect to each of a plurality of players of a computer-implemented online game, computing a plurality of indicators that includes in-game activities of in-game friends of the player as a distinct subset of all players of the online game;
   generating for each of the plurality of players, using at least one processor device configured therefor, a prediction model of the player's likelihood to spend in the online game generally within a predefined time window, the prediction model being based at least in part on the in-game activities of the in-game friends of the player;
   in an automated identification operation based at least in part on the respective prediction models and performed by one or more computer processors configured therefor, identifying players of the online game that are likely to spend in the online game;
   automatically assigning premium tiered servers to service the identified players, the premium tiered servers forming part of a server farm that comprises a plurality of tiered servers, the premium tiered servers having a higher performance than other tiered servers; and thereafter serving gameplay by the identified players using the assigned premium tiered servers.

2. The computer-implemented method of claim 1, further comprising, for each of the plurality of players:

generating an in-game player engagement indicator of the player in the online game;

determining an in-game payment history of the player in the online game;

generating an in-game friends engagement indicator of the in-game friends of the player of the online game;

determining an in-game friends payment history of the in-game friends of the player of the online game;

determining a number of other online games played by the player of the online game; and determining an in-game payment history in the other online games played by the player, wherein the plurality of indicators comprises the in-game player engagement indicator of the player in the online game, the in-game payment history of the player in the online game, the in-game friends engagement indicator of the in-game friends of the player of the online game, the in-game friends payment history of the in-game friends of the player of the online game, the number of other online games played by the player of the online game, and the in-game payment history in the other online games played by the user.

3. The computer-implemented method of claim 2, wherein the in-game player engagement indicator of the player in the online game corresponds to a measure of a user online in-game engagement using an exponential moving average of days played by the user during a last predetermined number of weeks.

4. The computer-implemented method of claim 2, wherein the in-game payment history of the player in the online game corresponds to a measure of the player's purchase activities in the online game.

5. The computer-implemented method of claim 2, wherein the in-game friends engagement indicator of the in-game friends of the player of the online game corresponds to an average player engagement for in-game friends of the player.

6. The computer-implemented method of claim 2, wherein the in-game friends payment history of the in-game friends of the player of the online game correspond to an average of a payment history of the in-game friends of the player.

7. The computer-implemented method of claim 2, wherein the number of other online games played by the player of the online game corresponds to the number of other games played by the player during a last predetermined number of months.

8. The computer-implemented method of claim 2, wherein the in-game payment history in the other online games played by the player corresponds to a measure of the player's purchase activities in the other online games.

9. The computer-implemented method of claim 1, further comprising:

assigning a premium tiered customer support service to service the identified players, the premium tiered customer support service having a prioritized customer support service over other tiered customer support services.

10. The method of claim 1, wherein the in-game activities of the in-game friends of the player comprises payment history of the friends in the game.

11. The method of claim 1, further comprising:

automatically generating a recommendation to the players identified by use of the prediction model as being likely to spend in the online game.

12. The computer-implemented method of claim 11, wherein the recommendation comprises a targeted email campaign to the identified players.

13. The computer-implemented method of claim 11, wherein the recommendation comprises in-game offers.

14. The computer-implemented method of claim 11, wherein the recommendation comprises in-game social coupons.

15. The computer-implemented method of claim 11, further comprising, for each of the plurality of players:

determining an average spending power of the player based on the prediction model; and generating a customized bundle offer based on the average spending power of the player.

16. A system comprising:

an analysis module comprising one or more processor devices configured to compute, with respect to each of a plurality of players of a computer-implemented online game, a plurality of indicators that includes in-game activities of in-game friends of the player as a distinct subset of all players of the online game;

a prediction module comprising at least one computer processor configured to generate, for each of the plurality of players, a prediction model of the player's likelihood to spend in the online game generally within a predefined time window, the prediction model being based at least in part on the in-game activities of the in-game friends of the player; and a premium tiered server module comprising one or more computer device configured to automatically assign premium tiered servers to service the identified players, the premium tiered servers forming part of a server farm that comprises a plurality of tiered servers, the premium tiered servers having a higher performance than other tiered servers, gameplay by the identified players subsequent to the assignment being served using the assigned premium tiered servers.

17. The system of claim 16, wherein the plurality of indicators comprises an in-game player engagement indicator of the player in the online game, an in-game payment history of the player in the online game, an in-game friends engagement indicator of the in-game friends of the player of the online game, an in-game friends payment history of the in-game friends of the player of the online game, a number of other online games played by the player of the online game, and an in-game payment history in other games played by the user.

18. The system of claim 16, wherein the in-game activities of the in-game friends of the player comprises payment history of the friends in the game.

19. The system of claim 16, further comprising:

a recommendation module comprising one or more computer processor devices configured to automatically generate a recommendation to the players identified by use of the prediction model as being likely to spend in the online game.

20. The system of claim 19, wherein the recommendation comprises a targeted email campaign to the identified players.

21. The system of claim 19, wherein the recommendation comprises in-game offers.

22. The system of claim 19, wherein the recommendation comprises in-game social coupons.

23. A non-transitory computer-readable storage medium storing a set of instructions that, when executed by a processor, cause the processor to perform operations, comprising:

with respect to each of a plurality of players of a computer-implemented online game, computing a plurality of indicators that includes in-game activities of in-game friends of the player as a distinct subset of all players of the online game;

generating for each of the plurality of players, a prediction model of the player's likelihood to spend in the online game generally within a predefined time window, the prediction model being based at least in part on the in-game activities of the in-game friends of the player;

based at least in part on the respective prediction models, identifying players of the online game that are likely to spend in the online game;

automatically assigning premium tiered servers to service the identified players, the premium tiered servers forming part of a server farm that comprises a plurality of tiered servers, the premium tiered servers having a higher performance than other tiered servers; and thereafter serving gameplay by the identified players using the assigned premium tiered servers.

24. The non-transitory computer-readable storage medium of claim 23, wherein the plurality of indicators comprises an in-game player engagement indicator of the player in the online game, an in-game payment history of the player in the online game, an in-game friends engagement indicator of the in-game friends of the player of the online game, an in-game friends payment history of the in-game friends of the player of the online game, a number of other online games played by the player of the online game, and an in-game payment history in other games played by the user.

* * * * *